(12) United States Patent
Kamo et al.

(10) Patent No.: US 9,614,234 B2
(45) Date of Patent: Apr. 4, 2017

(54) ION-EXCHANGE EQUIPMENT

(71) Applicant: ROKI CO., LTD., Hamamatsu-shi, Shizuoka (JP)

(72) Inventors: Kaoru Kamo, Hamamatsu (JP); Satoshi Shirayanagi, Hamamatsu (JP); Masaya Ogura, Hamamatsu (JP)

(73) Assignee: ROKI CO., LTD., Shizuoka (JP)

( * ) Notice: Subject to any disclaimer, the term of this patent is extended or adjusted under 35 U.S.C. 154(b) by 192 days.

(21) Appl. No.: 14/562,866

(22) Filed: Dec. 8, 2014

(65) Prior Publication Data

US 2015/0171440 A1 Jun. 18, 2015

(30) Foreign Application Priority Data

Dec. 16, 2013 (JP) ................. 2013-259218

(51) Int. Cl.
*H01M 8/04* (2016.01)
*B01D 15/18* (2006.01)
*H01M 8/04044* (2016.01)
*B01J 47/10* (2017.01)
*C02F 1/42* (2006.01)
*B01J 47/022* (2017.01)
*C02F 103/02* (2006.01)

(52) U.S. Cl.
CPC ........ *H01M 8/04044* (2013.01); *B01D 15/18* (2013.01); *B01J 47/022* (2013.01); *B01J 47/10* (2013.01); *C02F 1/42* (2013.01); *C02F 2103/023* (2013.01); *C02F 2201/003* (2013.01); *C02F 2301/026* (2013.01); *C02F 2303/08* (2013.01); *C02F 2303/10* (2013.01); *Y02W 10/30* (2015.05)

(58) Field of Classification Search
None
See application file for complete search history.

(56) References Cited

U.S. PATENT DOCUMENTS 2,874,847 A * 2/1959 Diamond ............... B01J 47/022
                                                    210/291
3,586,294 A * 6/1971 Strong ................... B01D 21/02
                                                    366/163.2

(Continued)

FOREIGN PATENT DOCUMENTS

DE 2147570 A1 * 3/1973 ............. B01J 47/10
FR 2900000 A1 10/2007

(Continued)

OTHER PUBLICATIONS

Translation of DE2147570 (Berhardt et al), Mar. 1973, obtained on Aug. 12, 2016 from <https://worldwide.espacenet.com/.*

*Primary Examiner* — Matthew O Savage
(74) *Attorney, Agent, or Firm* — Sughrue Mion, PLLC

(57) ABSTRACT

An ion-exchange equipment includes a tank unit formed with a cooling liquid flow-in port and a cooling liquid flow-out port and provided therein with an ion-exchange chamber, and an ion-exchange resin in form of particles filling the ion-exchange chamber of the tank unit. The ion-exchange chamber is provided so as to extend along an axial direction of the tank unit and the ion-exchange chamber has a circular cross section taken perpendicularly to the axial direction of the tank unit, and the cooling liquid flow-in port is formed so as to extend in a tangential direction of the ion-exchange chamber.

5 Claims, 4 Drawing Sheets

(56) References Cited

U.S. PATENT DOCUMENTS

2007/0108056 A1  5/2007  Nyberg et al.
2007/0264554 A1  11/2007  Fujita et al.

FOREIGN PATENT DOCUMENTS

| JP | 8-164386 A | 6/1996 |
| JP | 2005071709 A | 3/2005 |
| WO | 2013054758 A1 | 4/2013 |

\* cited by examiner

ION-EXCHANGE EQUIPMENT

BACKGROUND OF THE INVENTION

Field of the Invention

The present invention relates to an ion-exchange equipment for removing impurity ion contained in a cooling liquid in a fuel cell system, for example.

Description of the Related Art

In a conventional technology concerning a fuel cell system, in order to cool a fuel cell that generates heat according to power generation, a cooling circuit is provided for forcibly circulating a cooling liquid by operating a pump. In such cooling circuit, there may cause a case of generating rust or like in the cooling circuit because of circulation of the cooling liquid, and as a result, impurity ion may be generated in the cooling liquid by such rust or by splitting reaction of the cooling liquid.

Further, it is known that such impurity ion raises electric conductivity of the cooling liquid, which may lead to such a problem as that electricity generated by the fuel cell leaks externally through the cooling liquid, and hence, power generation efficiency is decreased. In order to obviate such problem, an ion-exchange equipment is provided in a cooling circuit of a fuel cell system for removing the impurity ion in the cooling liquid.

For removing such impurity ion, an ion-exchange resin fills an interior of such ion-exchange equipment, and the impurity ion in the cooling liquid is removed by passing the cooling liquid through the ion-exchange resin.

Further, since the ion-exchange resin does not move within the ion-exchange equipment, the cooling liquid hardly flows through the ion-exchange resin filling corner portions of the ion-exchanger equipment, which prohibits smooth and efficient ion-exchanging operation, thus being inconvenient.

In order to solve such problem or inconvenience mentioned above, known art provides a method, as disclosed in the Patent Document 1 (Japanese Patent Laid-open No. 8-164386), in which an ion-exchange resin is agitated or stirred inside the ion-exchange equipment to make even distribution of the ion-exchange resin within the ion-exchange equipment to thereby efficiently perform the removal of the impurity ion till expiration of date for use of the ion-exchange resin.

The ion-exchange equipment disclosed in the Patent Document 1 is equipped with a softening (demineralizing) tank provided with a liquid flow-in port (supply port) formed to a lower portion thereof and a liquid flow-out port (discharge port) formed to an upper portion thereof, an ion-exchange resin filling the softening tank, and a floating plate disposed between the liquid flow-in port and the liquid flow-out port of the softening tank and the ion-exchange resin, the floating plate being formed with a number of pores having a pore diameter smaller than a particle diameter of the ion-exchange resin.

According to the ion-exchange equipment of the Patent Document 1 having the structure mentioned above, when raw water is supplied into the softening tank while raising the floating plate by water flow of the raw water, the raw water is jetted through the pores of the floating plate, and hence, the ion-exchange resin is also blown upward and agitated into coagulated columnar form. As a result, the ion-exchange resin becomes entirely usable for the softening of the raw water.

However, according to the structure of the Patent Document 1, the floating plate is moved up and down inside the softening tank, there may cause a case in which abnormal noise is generated and the floating plate is damaged by abrasion. More specifically, when a fuel cell provided with such ion-exchange equipment is mounted to an automobile, a fear of strength poverty in structure is considered by vibration during running of the automobile.

In addition, in a conventional ion-exchange equipment mounted on an automobile, since the ion-exchange resin fills a softening tank by applying pressure, it is difficult for cooling liquid to flow smoothly and to avoid increase of pressure loss. Therefore, a fear that high load is applied to a pump for circulating the cooling liquid has been considered.

SUMMARY OF THE INVENTION

The present invention was made in consideration of the circumstances mentioned above and an object thereof is to provide an ion-exchange equipment capable of improving an ion exchanging efficiency of an ion-exchange resin filling an interior of a tank unit and suppressing a pressure loss due to cooling liquid flow.

The above and other objects can be achieved according to the present invention by providing an ion-exchange equipment which includes a tank unit formed with a cooling liquid flow-in port and a cooling liquid flow-out port and provided therein with an ion-exchange chamber, and an ion-exchange resin in form of particles filling the ion-exchange chamber of the tank unit, wherein the ion-exchange chamber is provided so as to extend along an axial direction of the tank unit and the ion-exchange chamber has a circular cross section taken perpendicularly to the axial direction of the tank unit, and the cooling liquid flow-in port is formed so as to extend in a tangential direction of the ion-exchange chamber.

In the present invention of the above aspect, the following preferred embodiments may be provided.

It may be desired that the cooling liquid flow-out port is formed to one end portion of the ion-exchange chamber and the tank unit is provided with a cylindrical member extending from the cooling liquid flow-out port toward a bottom surface of the ion-exchange chamber.

It may be also desired that the cylindrical member is formed, in a peripheral wall section thereof, with a plurality of holes each having a diameter smaller than that of each particle of the ion-exchange resin.

It may be also desired that the cylindrical member is disposed in the ion-exchange chamber so as to face the bottom surface of the ion-exchange chamber with a predetermined distance therebetween.

It may be further desired that the cooling liquid flow-in port is disposed on an upper end side of the ion-exchange chamber.

It may be further desired that the ion-exchange resin fills an interior of the ion-exchange chamber at a filling rate of not more than 80% of an inner volume of the ion-exchange chamber.

The above-mentioned preferred embodiments are not all the features essential for the present invention and sub-combinations thereof will also constitute the present invention.

According to the present invention of the characters mentioned above, the following advantageous effects and/or function will be attainable.

That is, in the ion-exchange equipment according to the present invention, the ion-exchange chamber extending along an axial direction of the tank unit has a circular cross section taken perpendicularly to the axial direction of the tank unit, and the cooling liquid flow-in port is formed so as to extend in a tangential direction of the ion-exchange chamber, and accordingly, the ion-exchange resin can revolve along the inner wall surface of the ion-exchange chamber by the flowing of the cooling liquid inside the ion-exchange chamber, and hence, the ion-exchange resin is not disproportionally present, thus the impurity ion being efficiently removed. Moreover, since the flow path of the cooling liquid can be sufficiently ensured, the pressure loss can be effectively suppressed.

Furthermore, according to the ion-exchange equipment of the present invention, since the cylindrical member is disposed in the ion-exchange chamber so as to extend axially, the flow path for the ion-exchange resin can be further ensured.

Still furthermore, in the ion-exchange equipment of the present invention, since a plurality of holes are formed to the peripheral wall surface, it becomes possible for the cooling liquid to flow out toward the flow-out port through these holes, the pressure loss can be further reduced.

Still furthermore, in the ion-exchange equipment of the present invention, since the cylindrical member is disposed in the ion-exchange chamber so as to face the bottom surface of the ion-exchange chamber with a predetermined distance therebetween, sufficient area of the peripheral wall surface can be ensured, thus further reducing the pressure loss.

Still furthermore, in the ion-exchange equipment of the present invention, since the cooling liquid flow-in port is disposed on an upper end side of the ion-exchange chamber, it becomes possible to elongate the cooling liquid flow path to thereby effectively remove the impurity ion.

Moreover, according to the ion-exchange equipment of the present invention, since the ion filling rate is not more than 80% of an inner volume of the ion-exchange chamber, the ion-exchange resin can be smoothly revolved inside the ion-exchange chamber, the cooling liquid flow path can be fully ensured, and hence, both the efficient removal of the impurity ion and reduction in pressure loss can be effectively achieved.

The nature and further characteristic features and functions of the present invention will be made clearer from the following descriptions with reference to the accompanying drawings.

DESCRIPTION OF THE PREFERRED EMBODIMENT

A preferred embodiment for carrying out the present invention will be described hereunder with reference to the accompanying drawings. It is to be noted that the described embodiment is not limited to the present invention recited in appended claims and combinations of characteristics of the embodiment described in the present specification is not essential to solve problems and/or object of the present invention, and it is also to be noted that terms such as "upper", "lower", "right", "left" and others indicating direction or like are used herein basically with reference to the illustration of the drawings.

Figure 1:
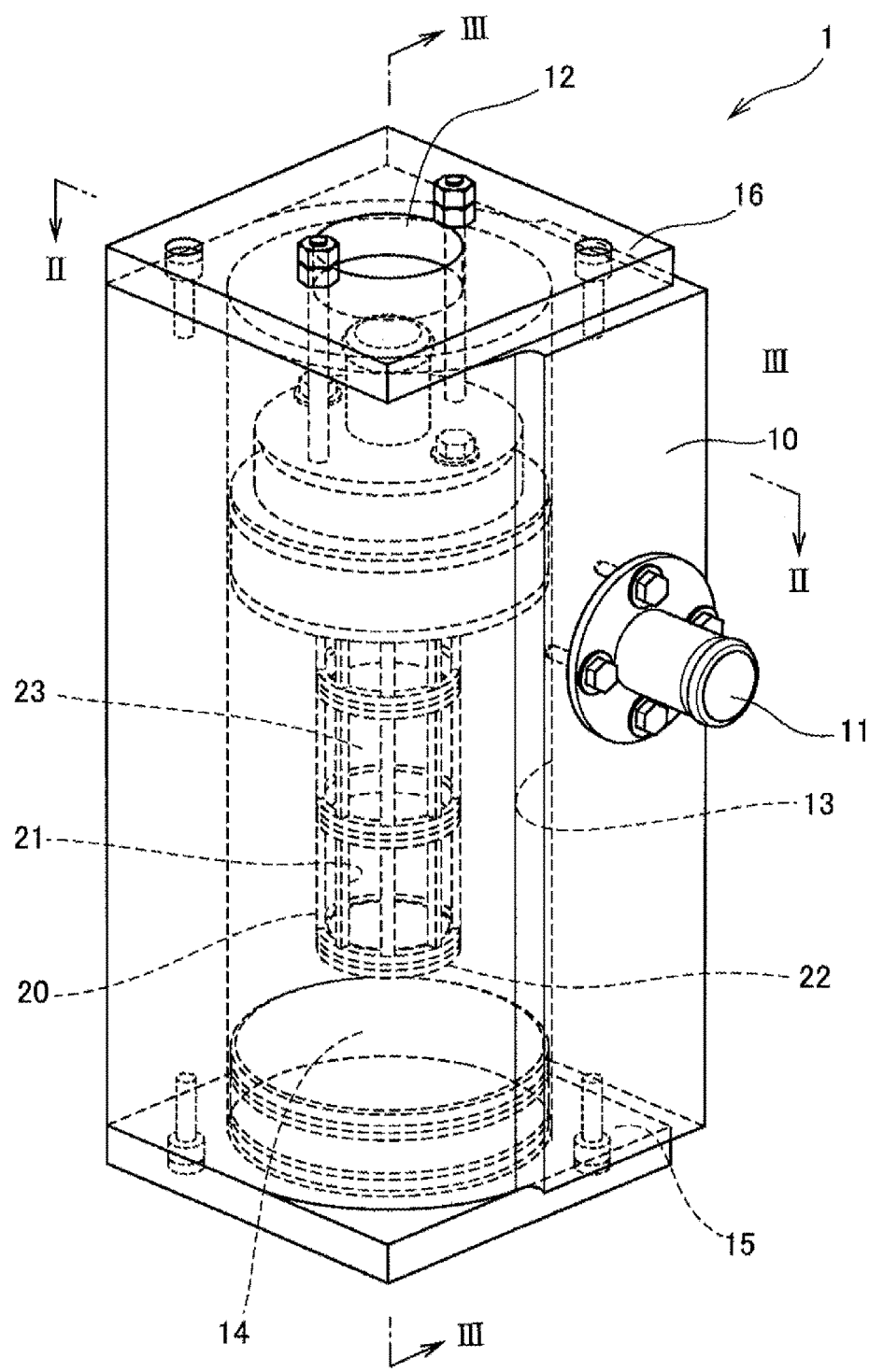
FIG. 1 is a perspective view illustrating an ion-exchange equipment according to an embodiment of the present invention.

With reference to FIG. 1, an ion-exchange equipment 1 according to one embodiment of the present invention is provided with a tank unit 10 having a flow-in port (supply port) connected to a cooling circuit for introducing cooling liquid inside the tank 10 and a flow-out port (discharge port) also connected to the cooling circuit for discharging the cooling liquid to the cooling circuit.

The tank unit 10 is formed with a circular through hole in a perpendicular direction thereof, and the circular through hole has both ends closed by lid members 15 and 16, respectively, to thereby form an ion-exchange chamber 13 extending in the axial direction of the tank unit 10 and having a circular cross section taken perpendicularly to the axial direction of the ion-exchange chamber.

The ion-exchange chamber 13 is filled up with ion-exchange resin composed of a number of particles, not shown, at filling rate of approximately 80% or less with respect to entire inner volume of the ion-exchange chamber 13. If such ion filling rate exceeds 80%, it becomes difficult to ensure a sufficient space for revolving and dispersing the ion-exchange resin inside the ion-exchange chamber, which will be explained hereinafter, which results in causing of high pressure loss. Thus, herein, the upper limit of the resin filling rate is set to approximately 80%.

Figure 4:
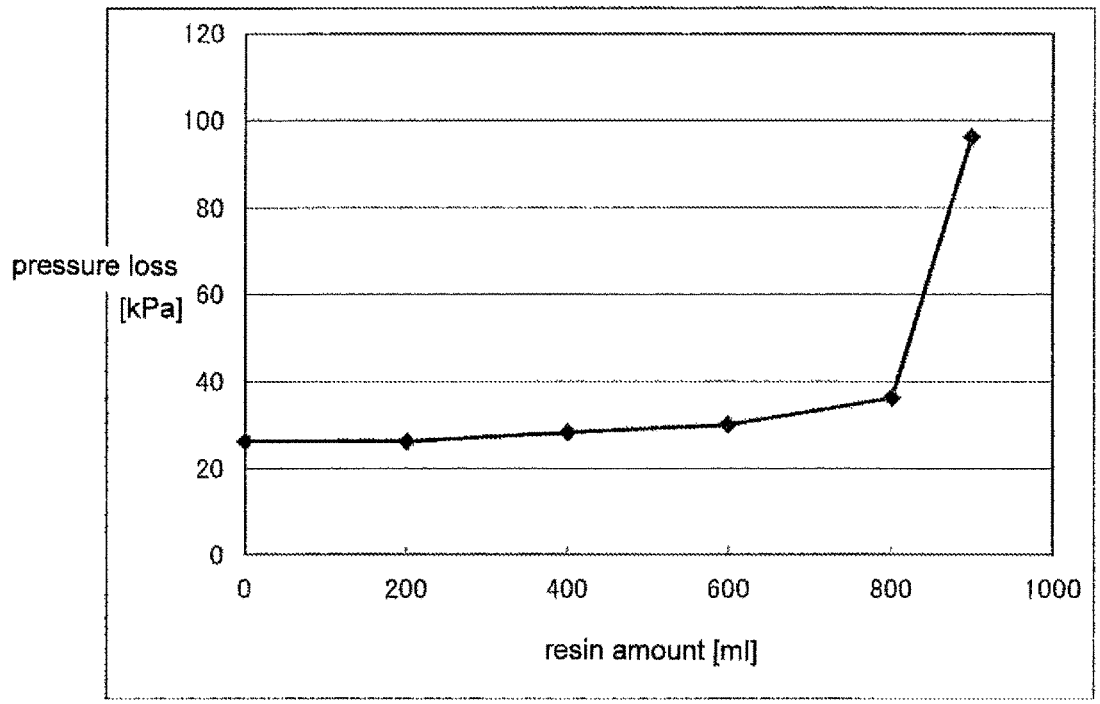
FIG. 4 is a graph representing a relationship between filling amount of the ion-exchange resin and pressure loss of the ion-exchange equipment according to the embodiment of the present invention.

Further, the reason why the upper limit of the resin filling rate is limited to 80% is based on an event such that, with reference to the graph of FIG. 4, when the ion-exchange resin filling amount in the ion-exchange chamber having inner volume of 900 ml is changed in the ion-exchanging rate, the ion-exchange resin amount exceeds an inner volume of 800 ml of the ion-exchange chamber, the pressure loss rapidly increases. Because of this matter, the ion-exchange resin filling rate is set to be not more than 88.8%, and preferably, approximately, not more than 80% in the present embodiment.

The flow-out port 12 is formed to the lid member 12 mounted to an upper end of the tank unit 10, and in the ion-exchange chamber 13, a cylindrical member 20 is located so as to extend directly downward toward a bottom surface 14 of the ion-exchange chamber 13.

The cylindrical member 20 is a tubular hollow cylindrical member capable of passing the cooling liquid therein, and a plurality of holes 21 are formed to a peripheral wall surface thereof and a mesh member 23 is provided so as to cover these holes 21, and the mesh member 23 is also formed with a plurality of holes each having a diameter smaller than that of the ion-exchange resin filling the ion-exchange chamber to thereby prevent the ion-exchange resin from leaking outward through the flow-out port (discharge port) 12. Further, since this mesh member 23 is made of stainless steel, the mesh member has a high strength to thereby effectively prevent the mesh member 23 from being damaged itself.

Figure 3:
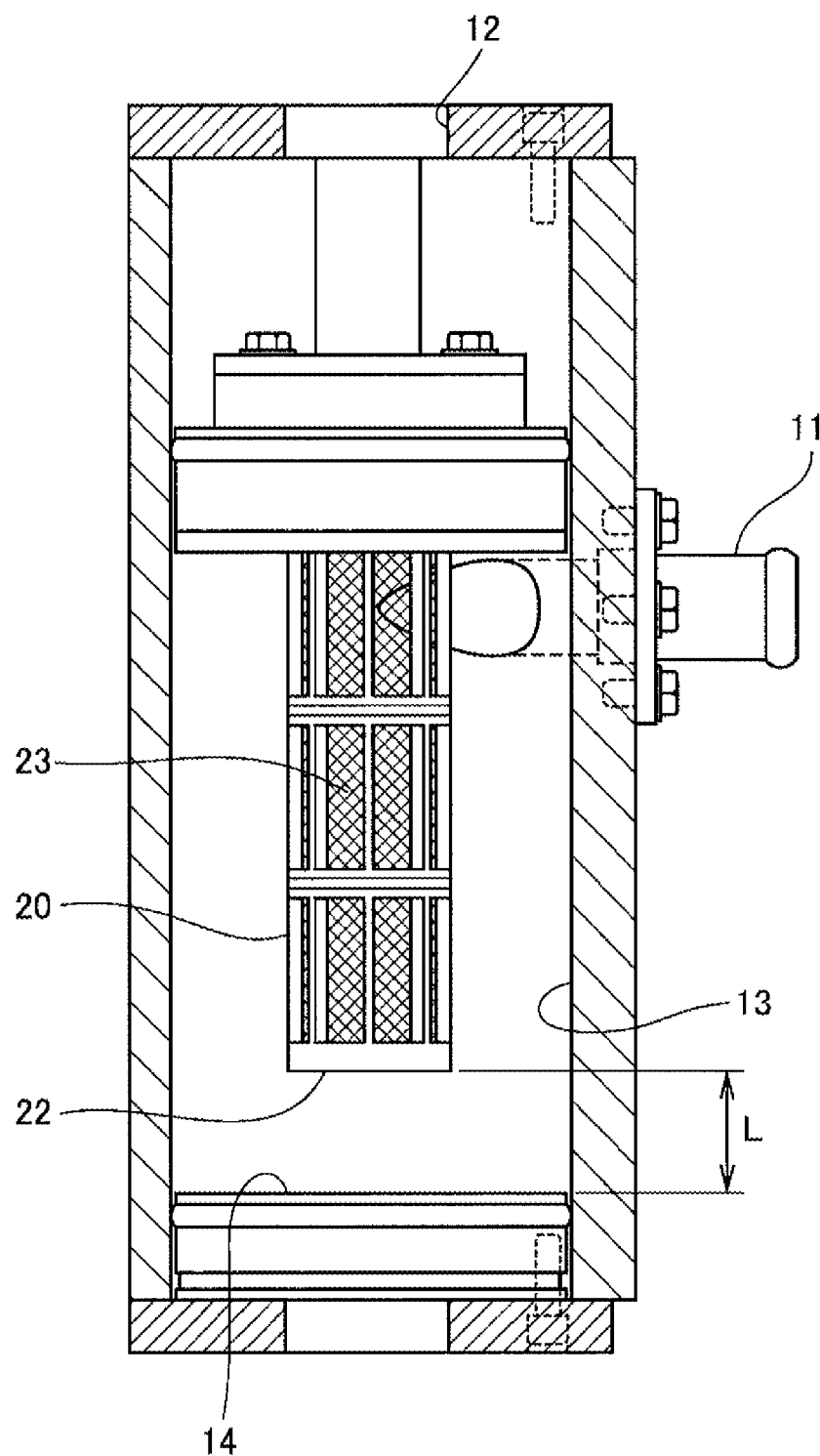
FIG. 3 is a sectional view taken along the line III-III in FIG. 1.

As shown in FIG. 3, the cylindrical member 20 is disposed in a manner that a lower (bottom) end 22a of the cylindrical member 20 is opposed to the bottom surface 14 of the ion-exchange chamber 13 so as to take a predetermined distance L between the lower end 22 of the cylindrical member 20 to the bottom surface 14 of the ion-exchange chamber 23. Although this distance L may be optionally changed in accordance with a required pressure loss and ion-exchange rate, the pressure loss can be reduced by setting this distance to be small. However, if the lower end 22 abuts against the bottom surface 23, the ion-exchange resin will clog, and it is necessary to set the distance L so as not to cause such clogging.

Furthermore, since the cylindrical member 20 is provides so as to extend axially with a predetermined clearance, a large surface area can be ensured, and hence, the pressure loss at a time when the cooling liquid passes through the holes 21 formed in the peripheral wall surface of the cylindrical member 20 can be effectively reduced.

Figure 2:
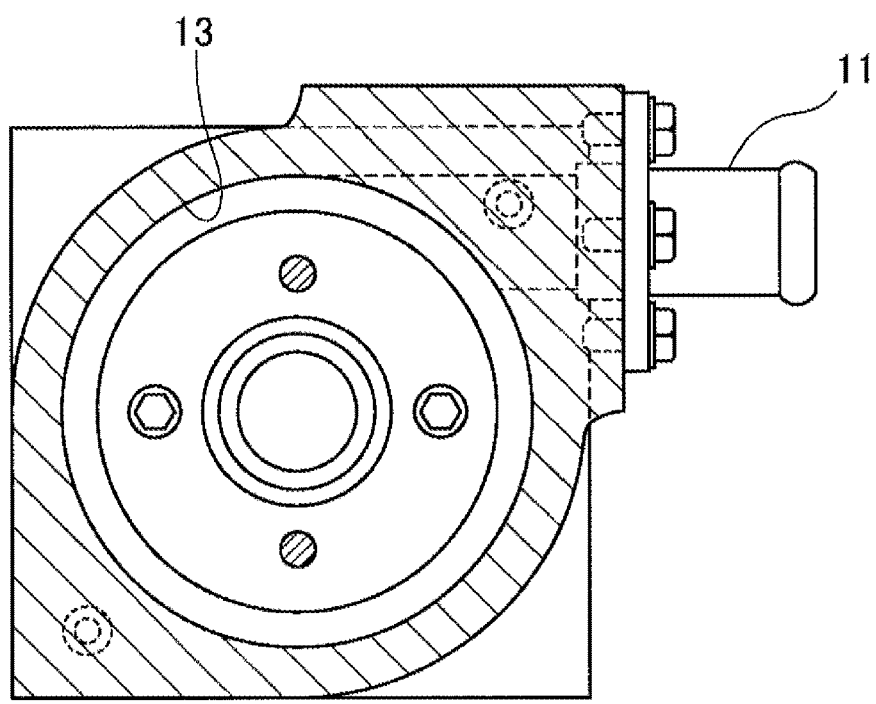
FIG. 2 is a sectional view taken along the line II-II in FIG. 1.

In the meantime, as shown in FIG. 2, the flow-in port 11 is formed so as to extend tangentially to the ion-exchange chamber 13, and as also shown in FIG. 3, the flow-in port 11 is arranged on the upper end side of the ion-exchange chamber 13. According to such arrangement of the flow-in port 11, the cooling liquid introduced through the flow-in port 11 forms a current of flow toward the flow-out port 12 while spirally turning along the inner wall surface of the ion exchange chamber 13 by flow-in power of the introduced cooling liquid through the flow-in port 11.

The ion-exchange resin filling the ion-exchange chamber 13 is packed with filling rate of not more than approximately 80% of the inner volume of the ion-exchange chamber 13, and accordingly, the ion-exchange resin is agitated by the spiral flow of the cooling liquid, as mentioned above, so that the ion-exchange resin can uniformly contact the cooling liquid and can be evenly used, thus improving the ion exchanging efficiency, and hence, effectively remove the impurity ion.

Furthermore, since the ion-exchange resin is dispersed by being agitated along the cooling liquid flow, the clearance between the particles constituting the ion-exchange resin can be sufficiently ensured and the cooling liquid can thus easily flow, thereby suppressing the pressure loss of the ion-exchange resin to be low.

EXAMPLE

Figure 5:
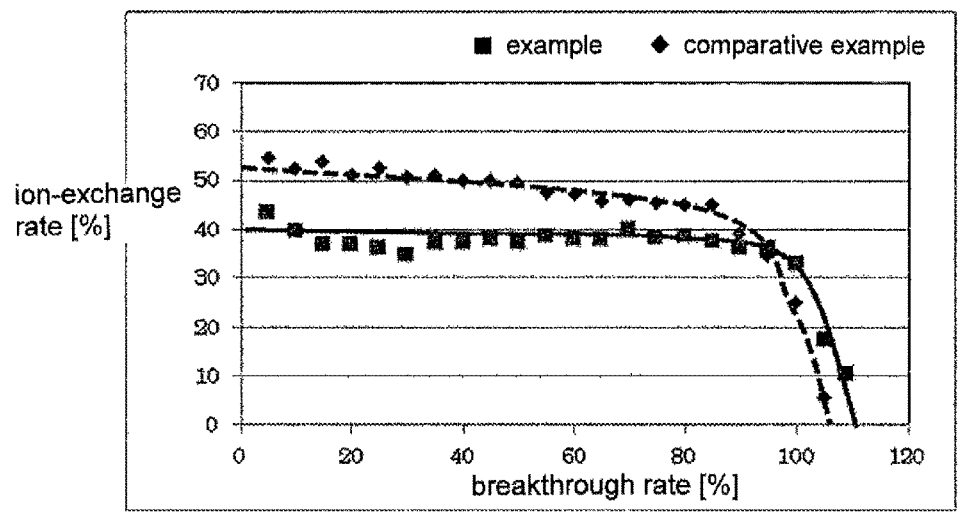
FIG. 5 is a graph representing a relationship between ion exchanging efficiency and breakthrough ratio of the ion-exchange equipment according to the embodiment of the present invention.

FIG. 5 is a graph representing an ion-exchange rate and a breakthrough rate between an example of the ion-exchange equipment 1 according to the embodiment of the present invention and a comparative example having a structure in which a conventional ion-exchange resin fills under pressure.

As is apparent from the graph of FIG. 5, in the example of the present invention, the ion-exchange resin could maintain the initial function and efficiency till the ion-exchange resin was broken through and the ion-exchange reaction proceeded till the breakthrough rate reached 100%.

On the other hand, in the comparative example, the ion-exchange resin could not maintain the initial efficiency till the ion-exchange resin was broken through and the efficiency of the ion-exchange reaction reduced before the breakthrough rate reached 100%. From this fact, it is found that the ion-exchange resin in the example of the present invention can efficiently remove the impurity in comparison with reference to the graph of FIG. 5.

It is further to be noted that the present invention is not limited to the embodiment described above and many other changes and modifications or alternations may be made without departing from the scope of the appended claims.

For example, as described above, with the ion-exchange equipment 1 according to the present embodiment, although the description was made as the case in which the flow-in port 11 is provided on the upper end side of the ion-exchange chamber 13, the arranged position of the flow-in port 11 is not limited to such position as described above, and it may be possible to arrange the flow-in port as far as the flow-in port is provided in the direction tangential to the ion exchange chamber 13.

Furthermore, in the described embodiment, although the flow-out port 12 is provided to the upper end surface of the tank unit 10, the flow-out port may be provided to any other portion of the tank unit 10 as far as the cooling liquid can flow out, and the cylindrical member 20 disposed in the ion-exchange chamber 13 may not be provided Still furthermore, although the described embodiment provides the flow-out port 12 formed to the upper end surface of the tank unit 10, the flow-out port 12 may be provided to any portion of the tank unit as far as the cooling liquid can flow out, and the cylindrical member 20 disposed in the ion-exchange chamber 13 may not be provided. Furthermore, the mesh 23 covering the hole 21 may be formed of a synthetic resin, for example, in spite of the steel as mentioned above.

What is claimed is:

1. An ion-exchange equipment comprising: a tank unit formed by a sidewall having open top and bottom ends and defining a cooling liquid flow-in port, a top member received in the open top end and defining a cooling liquid flow-out port, and an imperforate bottom member received in the open bottom end, wherein inner surfaces of the sidewall, top member, and imperforate bottom member of the tank unit define an ion-exchange chamber, and wherein the inner surface of the bottom lid closes a bottom end of the ion exchange chamber;
   an ion-exchange resin in form of particles filling the ion-exchange chamber of the tank unit such that the filling rate does not exceed 88.8% of the volume of the ion exchange chamber, wherein the ion-exchange chamber is provided so as to extend along an axial direction of the tank unit and the ion-exchange chamber has a circular cross section taken perpendicularly to the axial direction of the tank unit, and the cooling liquid flow-in port is formed so as to extend in a tangential direction of the ion-exchange chamber,
   wherein the cooling liquid flow-out port is provided with a cylindrical member that is disposed within the ion-exchange chamber and is spaced radially inwardly from the inner surface of the sidewall, the cylindrical member extending downwardly from the cooling liquid flow-out port toward the inner surface of the imperforate bottom member such that a lower end of the cylindrical member is opposed to the inner surface of the imperforate bottom member.

2. The ion-exchange equipment according to claim 1, wherein the cylindrical member is formed, in a peripheral wall section thereof, with a plurality of holes each having a diameter smaller than that of each particle of the ion-exchange resin.

3. The ion-exchange equipment according to claim 1, wherein the cylindrical member is disposed in the ion-exchange chamber so as to face the inner surface of the imperforate bottom member with a predetermined distance there between.

4. The ion-exchange equipment according to claim 1, wherein the cooling liquid flow-in port opens into an upper end side of the ion-exchange chamber.

5. The ion-exchange equipment according to claim 1, wherein the ion-exchange resin fills an interior of the ion-exchange chamber at a filling rate of not more than 80% of an inner volume of the ion-exchange chamber.

* * * * *